(12) United States Patent
Hoover

(10) Patent No.: US 8,587,832 B2
(45) Date of Patent: Nov. 19, 2013

(54) DUAL COLOR MATCHING FEEDBACK CONTROL METHOD AND SYSTEM FOR HIDING INFRARED MARKINGS AND OTHER INFORMATION

(75) Inventor: Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/157,884

(22) Filed: Jun. 10, 2011

(65) Prior Publication Data

US 2012/0314231 A1    Dec. 13, 2012

(51) Int. Cl.
*G06F 15/00* (2006.01)
(52) U.S. Cl.
USPC ........... 358/1.9; 358/2.1; 358/3.28; 358/518; 358/540; 382/100; 382/232; 283/902; 399/366
(58) Field of Classification Search
None
See application file for complete search history.

(56) References Cited

U.S. PATENT DOCUMENTS

| | | | | |
|---|---|---|---|---|
| 3,601,589 | A * | 8/1971 | McCarty | 382/165 |
| 6,354,502 | B1 | 3/2002 | Hagstrom et al. | 235/462.04 |
| 6,547,146 | B1 | 4/2003 | Meksavan et al. | 235/462.46 |
| 6,764,970 | B1 | 7/2004 | Kuoni | 442/301 |
| 6,857,573 | B2 | 2/2005 | Urano et al. | 235/468 |
| 7,684,082 | B2 | 3/2010 | Mestha et al. | 358/1.9 |
| 8,261,988 | B2 * | 9/2012 | Zhao et al. | 235/462.09 |
| 2002/0190129 | A1 | 12/2002 | Urano et al. | 235/462.27 |
| 2005/0166781 | A1 * | 8/2005 | Fritz et al. | 101/491 |
| 2005/0240366 | A1 | 10/2005 | Mestha et al. | 702/76 |
| 2008/0052023 | A1 * | 2/2008 | Kettler | 702/82 |
| 2009/0097028 | A1 | 4/2009 | Vogh, Jr. | 356/407 |
| 2009/0237682 | A1 | 9/2009 | Bala et al. | 358/1.9 |
| 2009/0262400 | A1 * | 10/2009 | Eschbach et al. | 358/3.28 |
| 2010/0092083 | A1 | 4/2010 | Herloski et al. | 382/168 |
| 2010/0097669 | A1 * | 4/2010 | Roscoe et al. | 358/504 |
| 2010/0228511 | A1 * | 9/2010 | Chin et al. | 702/82 |
| 2011/0089316 | A1 | 4/2011 | Hosier et al. | 250/252.1 |

* cited by examiner

*Primary Examiner* — Miya J Cato
(74) *Attorney, Agent, or Firm* — Luis M. Ortiz; Kermit D. Lopez; Ortiz & Lopez, LLC

(57) ABSTRACT

A dual color matching feedback control method, system and processor-readable medium for hiding an infrared marking in a wide range of customer selectable colors. The approach includes an inline spectrophotometer sensor to measure at least two color mixtures and a matching color feedback control unit adjusts the two mixtures to match each other in color appearance. A customized color can be selected from a smaller gamut of darker color by a customer and a sufficient difference in a black toner (k toner) between the two color mixtures can be maintained to provide sufficient contrast for the infrared detection. An initial match can be provided by incorporating a color model that is similar to a predicted color mixture. The two colors can then be rendered and adjusted for better match prior to rendering the hidden mark. Such an approach adjusts an amount of other toners so that the color difference between the hidden mark colorant and a surrounding colorant is minimized and a presence of the hidden mark is less detectable to the observer under a standard condition.

20 Claims, 4 Drawing Sheets

DUAL COLOR MATCHING FEEDBACK CONTROL METHOD AND SYSTEM FOR HIDING INFRARED MARKINGS AND OTHER INFORMATION

TECHNICAL FIELD

Embodiments are generally related to hidden marks and applications thereof. Embodiments are also related to infrared barcodes. Embodiments are additionally related to inline spectrophotometers and sensors thereof. Embodiments are also related to dual color matching and feedback control applications.

BACKGROUND OF THE INVENTION

Hidden marks such as, for example, barcodes, text, security marks and other information-rich symbols containing information can be incorporated into a particular graphical design along with a customized color that compliments or matches the graphical design selected by a user (e.g., a customer). Barcodes, for example, can be utilized to embed data in a printed format in order to provide automated identification and tracking capabilities in a number of applications. A color barcode may record more information than a black and white barcode by multi-valued recording. Production printing applications, such as, for example, photo book printing, typically hide the barcodes at the bottom right hand corner of a back cover.

Conventional approaches for matching two colors for hiding infrared markings involve limiting the user to select from a palette of a limited number of qualified match colors. Additionally, maintaining a sufficiently large difference in a black toner (k toner) assures an adequate contrast for discerning the hidden marks. The contrast can be detected under an infrared illumination (e.g., using an infrared barcode reader) as the colorant with blacker toner absorbs more infrared and appears darker.

Unfortunately, different amounts of black toner can create color differences that may be noticeable under a standard viewing condition. Furthermore, hiding the marks or degree that the observer can visualize the hidden mark is highly dependent on matching the two colors. The marks become easier to visualize if a color rendering device drifts or does not provide consistency in color matching.

Based on the foregoing, it is believed that a need exists for an improved dual color matching feedback control system and method for hiding an infrared marking. A need also exists for maintaining sufficient difference in a black toner between color mixtures to provide sufficient contrast for the infrared detection, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved invisible infrared marking system and method.

It is another aspect of the disclosed embodiments to provide for an improved dual color matching feedback control system and method for hiding an infrared marking.

It is further aspect of the disclosed embodiment to provide for an improved system and method for maintaining sufficient difference in a black toner between color mixtures to provide sufficient contrast for the infrared detection.

The aforementioned aspects and other objectives and advantages can now be achieved as described herein. A dual color matching feedback control method, system and processor-readable medium for hiding an infrared marking (e.g., barcode, hidden text, security marks, other information-rich symbols containing variable information) in a wide range of customer selectable colors is disclosed herein. The system can be configured to include an inline spectrophotometer sensor that measures two or more color mixtures and a matching color feedback control unit that adjusts the two (or more) mixtures to match each other in color appearance. A customized color can be selected from a smaller gamut of darker color by a customer and a sufficient difference in a black toner (k toner) between the two color mixtures can be maintained to provide sufficient contrast for the infrared detection. An initial match can be provided by incorporating a color model that is similar to a predicted color mixture. The two colors can then be rendered and adjusted for better matching prior to rendering the hidden marks. Such an approach adjusts the amounts of other toners so that the color difference between the hidden mark colorant and a surrounding colorant is minimized and a presence of the hidden mark is less detectable to the observer under a standard condition.

The dual color matching control approach described herein also provides improved hiding even for a limited palette of colors. The matching control unit can compensate for differences across a color rendering device, a toner batch, color drift and other noise sources that cause the colors to become noticeably different. The set of colors that can effectively incorporate the hidden mark can also be increased. Such a feedback approach maintains adequate performance and periodically provides consistency and stability to match the colors thereby improving and maintaining the invisibility of the hidden marks.

A number of embodiments, preferred and alternative, are disclosed. For example, in one embodiment, a dual color matching feedback control method can include the steps or operations of measuring at least two color mixtures utilizing an inline spectrophotometer sensor in order to thereafter adjust the at least two color mixtures to match each other in color appearance; selecting a customized color from a smaller gamut of darker color by a customer and maintaining a sufficient difference in a black toner between the at least two color mixtures to provide a sufficient contrast for an infrared detection; and providing an initial match by incorporating a color model that is similar to a predicted color mixture in order to thereafter render and adjust the at least two colors for a better match prior to rendering a hidden mark.

In another embodiment, a step or operation can be implemented for adjusting the at least two color mixture to match each other in the color appearance via a matching color control unit. In yet another embodiment, a step or operation can be implemented for adjusting an amount of other toner so that a color difference between the hidden mark colorant and a surrounding colorant is minimized and a presence of the hidden mark is less detectable to the observer under a standard condition. In still another embodiment, a step or operation can be implemented for hiding the mark in a broader range from the customer selectable color. In yet another embodiment, an operation or step can be implemented for providing the hiding for a limited palette of colors. In still other embodiments, an operation or step can be implemented for compensating differences across at least one of a color rendering device, a toner batch, a color drift and a noise source in order to cause the at least two colors to become noticeably different via the matching color control unit. In other embodiments, a step or operation can be implemented for providing consistency and stability to match the at least two colors to improve and maintain an invisibility of the hidden mark. In other embodiments, the hidden mark may be a barcode, text, a security mark, etc.

In still another embodiment, a system can be implemented for dual color matching feedback control. Such a system may include, for example, a processor and a data bus coupled to the processor. Such a system can also include a computer-usable medium embodying computer code, the computer-usable medium being coupled to the data bus, the computer program code comprising instructions executable by the processor and configured for measuring at least two color mixtures utilizing an inline spectrophotometer sensor in order to thereafter adjust the at least two color mixtures to match each other in color appearance; selecting a customized color from a smaller gamut of darker color by a customer and maintaining a sufficient difference in a black toner between the at least two color mixtures to provide a sufficient contrast for an infrared detection; and providing an initial match by incorporating a color model that is similar to a predicted color mixture in order to thereafter render and adjust the at least two colors for a better match prior to rendering a hidden mark.

In some embodiments, such instructions can be further configured for adjusting the at least two color mixtures to match each other in the color appearance via a matching color control unit. In another embodiment, the instructions can be configured for adjusting an amount of other toner so that a color difference between the hidden mark colorant and a surrounding colorant is minimized and a presence of the hidden mark is less detectable to the observer under a standard condition. In yet another embodiment, such instructions can be further configured for hiding the mark in a broader range from the customer selectable color. In yet another embodiment, such instructions can be further configured for compensating differences across at least one of a color rendering device, a toner batch, a color drift and a noise source in order to cause the at least two colors to become noticeably different via the matching color control unit. In still other embodiments, such instructions can be further configured for periodically providing consistency and stability to match the at least two colors to improve and maintain an invisibility of the hidden mark. As indicated previously, the hidden mark can be a barcode, text, a security mark, etc.

In still other embodiments, a processor-readable medium storing code representing instructions to cause a processor to perform a process, can be implemented. Such code may comprise code to, for example, measure at least two color mixtures utilizing an inline spectrophotometer sensor in order to thereafter adjust the at least two color mixtures to match each other in color appearance; select a customized color from a smaller gamut of darker color by a customer and maintaining a sufficient difference in a black toner between the at least two color mixtures to provide a sufficient contrast for an infrared detection; and provide an initial match by incorporating a color model that is similar to a predicted color mixture in order to thereafter render and adjust the at least two colors for a better match prior to rendering a hidden mark. The code can be further configured in other embodiments to adjust the at least two color mixture to match each other in the color appearance via a matching color control unit.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
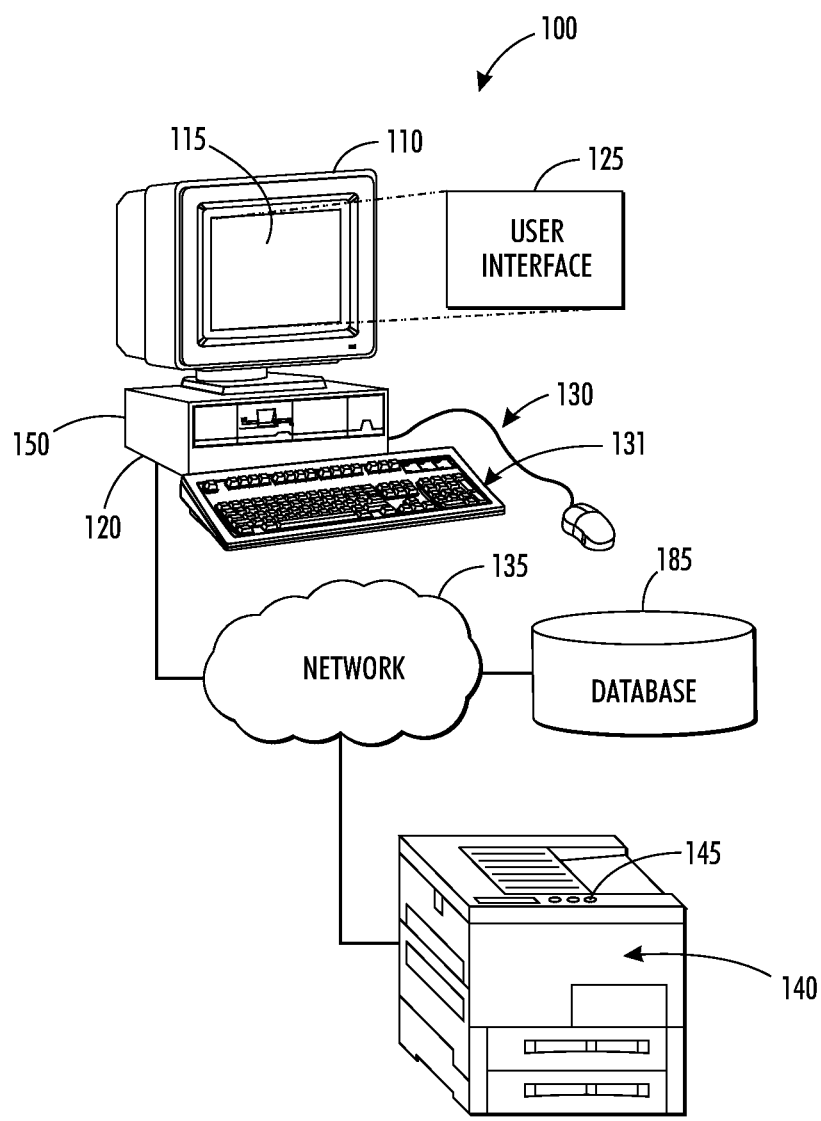
FIG. 1 illustrates an example of a rendering device coupled to a data-processing apparatus through a network, in accordance with the disclosed embodiments.

Referring to FIG. 1, system 100 includes a rendering device 140 that communicates with a data-processing apparatus 110 through a network 135. In some embodiments, rendering device 140 may be a rendering device such as, for example, a printer, scanner, copy machine, workstation, mobile display, a combination thereof, etc. In other embodiments, rendering device 140 may be an MFD. The data-processing apparatus 110 may be, for example, a personal computer or other computing device, and generally includes a central processor 120, a display device 115, a keyboard 131, and a pointing device 130 (e.g., mouse, track ball, pen device, touch, tactile, haptic, or the like). Additional input/output devices, such as the rendering device 140 may be included in association with the data-processing apparatus 110 as desired.

Note that as utilized herein, the term rendering device may refer to an apparatus or system such as a printer, scanner, fax machine, copy machine, etc., and/or a combination thereof (e.g., an MFD). Preferably, rendering device 140 is capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying.

The data-processing apparatus 110 shown in FIG. 1, for example, can be coupled to the rendering device 140 (and other rendering devices) through a computer network 135 in the context of a print shop environment. A network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 140 can include the use of a user interface 145, such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 can include a GUI (Graphical User Interface) 125 that allows a user to interact with the data-processing apparatus 110 and also network 135 and networked devices such, for example, the rendering device 140 depicted in FIG. 1. The user interface 125 generally displays information and receives data through a device display and/or via the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

The input device of the rendering device 140, for example, may be a local user interface 145, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface 145 by manipulating the touch screen, keypad, or communicating via wireless messages through the wireless port. The administrator's portable device that communicates wirelessly may be a personal digital assistant (PDA), or the like, as noted above.

Figure 2:
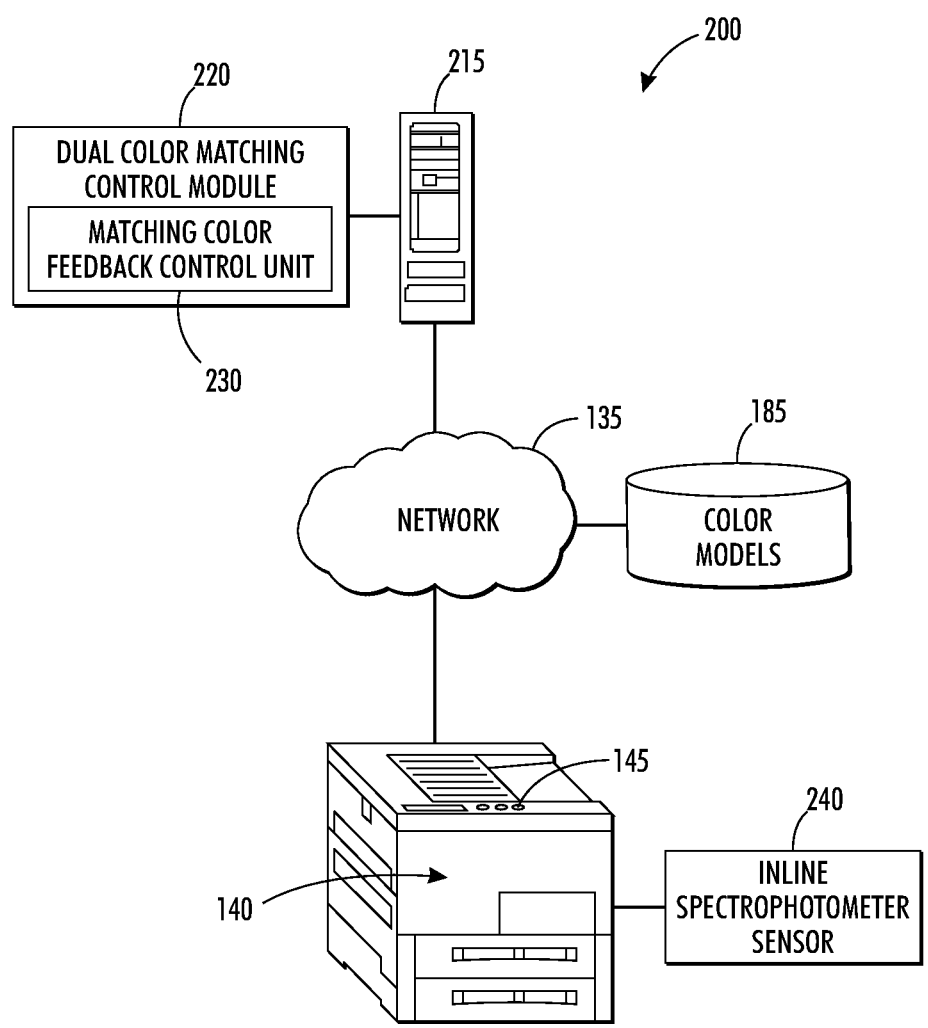
FIG. 2 illustrates a block diagram of a dual color matching control system, in accordance with the disclosed embodiments.

The following description is presented with respect to embodiments of the present invention, which can be embodied in the context of a customer device 110 and rendering device 140 depicted in FIG. 2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including, for example, Ethernet, the Internet, wireless networks, other networked systems.

FIG. 2 illustrates a block diagram of a dual color matching feedback control system 200, in accordance with the disclosed embodiments. Note that in FIGS. 1-4, identical or similar blocks are generally indicated by identical reference numerals. The dual color matching feedback control system 200 generally includes the network infrastructure 135 associated with the networked rendering device 140 and a server 215. Data-processing system 110 depicted in FIG. 1 can be, for example, a server. Other devices such as, for example, desktops, network devices, palmtops, mobile phones, etc may also be connected to the network 135, as service providers.

A dual color matching feedback control module 220 configured in association with the server 215 can be adapted for hiding an infrared marking in a wide range of customer selectable colors. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

The system 200 includes an inline spectrophotometer sensor 240 that can communicate with the rendering device 140 (or other devices not shown in FIG. 2) to measure two or more color mixtures. Note that the spectrophotometer is a photometer (a device for measuring light intensity) that can measure intensity as a function of the light source wavelength. The features of spectrophotometers are spectral bandwidth and linear range of absorption or reflectance measurement. The spectrophotometers can be commonly employed to measure properties of light over a specific portion of an electromagnetic spectrum, typically utilized in spectroscopic analysis to identify materials. The term spectrophotometer can be applied to instruments that operate over a very wide range of wavelengths, from gamma rays and X-rays into the far infrared.

One example of a spectrophotometer that can be utilized to implement the inline spectrophotometer sensor 240 is disclosed in U.S. Patent Application Publication No. 20100092083 entitled "In-Line Linear Variable Filter Based Spectrophotometer," which published to Herloski, et al on Apr. 15, 2010, and is assigned to the Xerox Corporation of Norwalk, Conn., U.S.A. U.S. Patent Application Publication No. 20100092083 is incorporated herein by reference in its entirety. Another example of a spectrophotometer that can be utilized to implement the inline spectrophotometer sensor 240 is disclosed in U.S. Patent Application Publication No. 20110089316, entitled "In-Line Image Sensor in Combination With Linear Variable Filter Based Spectrophotometer," which published to Hosier, et al on Apr. 12, 2011, and is assigned to the Xerox Corporation of Norwalk, Conn., U.S.A. U.S. Patent Application Publication No. 20110089316 is incorporated herein by reference in its entirety.

The dual color matching feedback control system 200 controls the matching of the two colors mixtures of the hidden marks in order to provide better hiding and sufficient contrast in infrared sensing. In general, the hidden marks cannot be detected by eye and can be employed to identify objects and documents to determine the authenticity. The hidden marks may also serve to carry concealed information regarding the origin, application, authorship, history, proper application, intellectual property ownership, derivation, and authenticity of documents and objects.

A matching color feedback control unit 230 configured in association with the dual matching color feedback control module 200 adjusts the two color mixtures to match each other in color appearance. A customized color can be selected from a smaller gamut of darker color by a customer and a sufficient difference in a black toner between the two color mixtures can be maintained to provide sufficient contrast for the infrared detection. An initial match can be provided by incorporating a color model stored in the database 185 that is similar to a predicted color mixture. The two colors can then be rendered and adjusted by the rendering device 140 to converge to best match prior to rendering the hidden marks. Such an approach adjusts the amounts of other toners so that the color difference between the hidden mark colorant and the surrounding colorant is minimized and the presence of the hidden mark is less detectable to the observer under a standard condition.

Note that the hidden mark can be for example, a barcode, hidden text, a security mark or other information-rich symbols containing variable information, depending upon design considerations. It can be appreciated that the discussion of barcodes, herein is presented for general illustrative purposes only, and that other types of hidden marks can be implemented in accordance with alternative embodiments.

Figure 3:
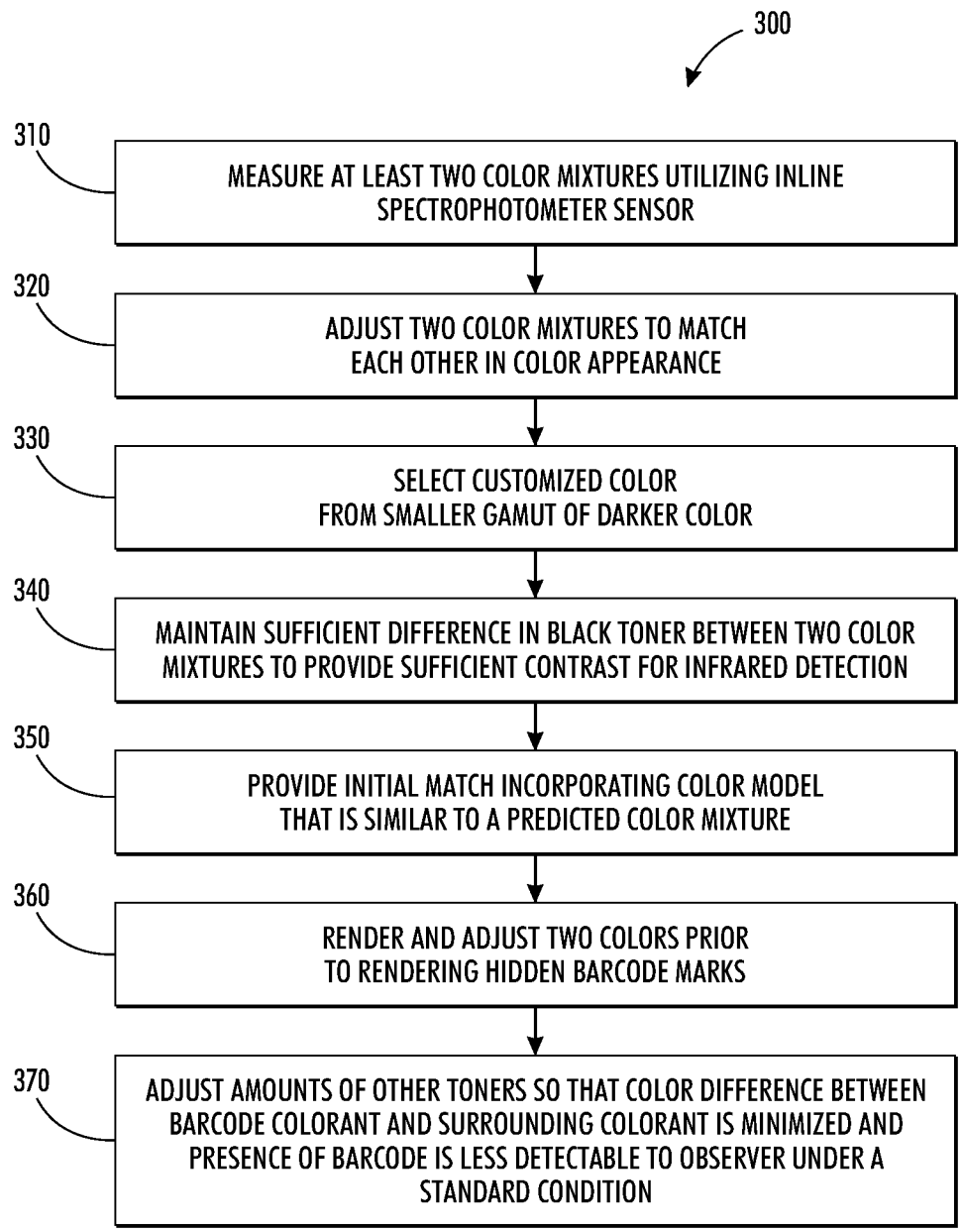
FIG. 3 illustrates a high level flow chart of operating illustrating logical operational steps of a method for hiding an infrared marking in a wide range of customer selectable colors, in accordance with the disclosed embodiments.

FIG. 3 illustrates a high level flow chart of operating illustrating logical operational steps of a method 300 for hiding an infrared marking (e.g., hidden text, security marks, barcodes, etc) in a wide range of customer selectable colors, in accordance with the disclosed embodiments. As depicted at block 310, the two (or more) color mixtures discussed above can be measured utilizing, for example, the inline spectrophotometer sensor 240 depicted in FIG. 2. The color mixtures can be adjusted to match each other in color appearance, as indicated at block 320. Thereafter, as described at block 330, a customized color can be selected from the smaller gamut of darker color by the customer. The sufficient difference in black toner between the two color mixtures can be maintained to provide sufficient contrast for the infrared detection, as illustrated at block 340. An initial match can be provided by incorporating a color model that is similar to a predicted color mixture, as illustrated at block 350. The two colors can then be rendered and adjusted to converge to best match prior to rendering the hidden marks, as indicated at block 360. The amount of other toners can be adjusted so that color difference between hidden mark colorant and surrounding colorant is minimized and presence of the hidden mark is less detectable to observer under a standard condition, as illustrated at block 370.

Figure 4:
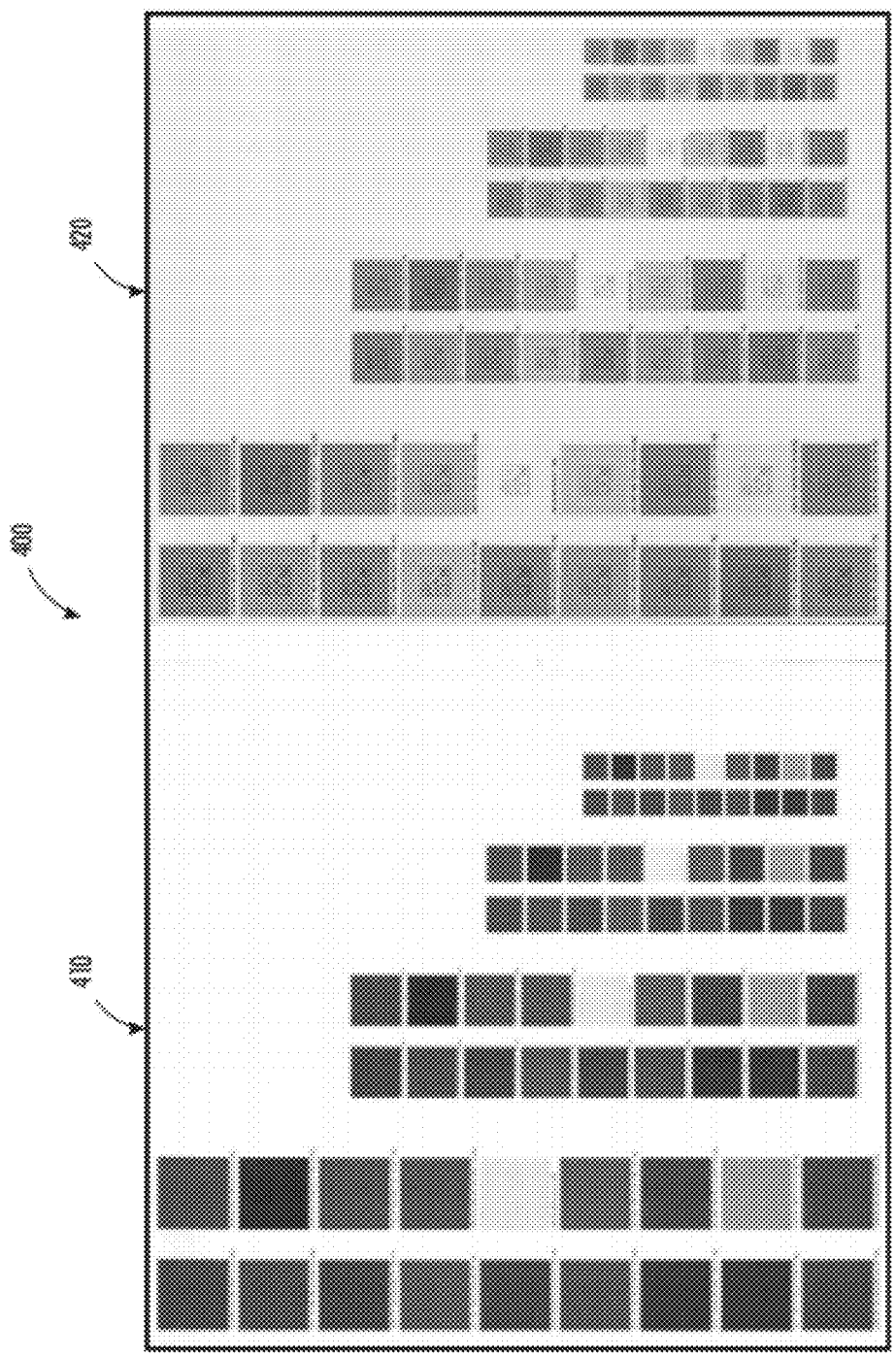
FIG. 4 illustrates a representative example palette of eighteen color pairs with enough difference in a black toner in two color mixtures to provide good hiding and good contrast for the infrared barcode reading, in accordance with the disclosed embodiments.

FIG. 4 illustrates a representative example palette 400 of eighteen color pairs with enough difference in the black toner in two color mixtures to provide good hiding and good contrast for the infrared barcode reading, in accordance with the disclosed embodiments. The example palette 400 represents a color scan image 410 and an infrared scan image 420. The dual color matching control system 100 also provides improved hiding even for a limited palette of colors. The matching control unit 230 can compensate for differences across the color rendering device 140, a toner batch, color drift and other noise sources that cause the colors to become noticeably different. The set of colors that can effectively incorporate the hidden barcodes can also be increased. Such a feedback approach maintains adequate performance and periodically provides consistency and stability to match the colors thereby improving and maintaining the invisibility of the hidden barcodes.

Based on the foregoing it can be appreciated that a number of embodiments, preferred and alternative, can be implemented. For example, in one embodiment, a dual color matching feedback control method can include the steps or operations of measuring at least two color mixtures utilizing an inline spectrophotometer sensor in order to thereafter adjust the at least two color mixtures to match each other in color appearance; selecting a customized color from a smaller gamut of darker color by a customer and maintaining a sufficient difference in a black toner between the at least two color mixtures to provide a sufficient contrast for an infrared detection; and providing an initial match by incorporating a color model that is similar to a predicted color mixture in order to thereafter render and adjust the at least two colors for a better match prior to rendering a hidden mark.

In another embodiment, a step or operation can be implemented for adjusting the at least two color mixture to match each other in the color appearance via a matching color control unit. In yet another embodiment, a step or operation can be implemented for adjusting an amount of other toner so that a color difference between the hidden mark colorant and a surrounding colorant is minimized and a presence of the hidden mark is less detectable to the observer under a standard condition. In still another embodiment, a step or operation can be implemented for hiding the mark in a broader range from the customer selectable color. In yet another embodiment, an operation or step can be implemented for providing the hiding for a limited palette of colors. In still other embodiments, an operation or step can be implemented for compensating differences across at least one of a color rendering device, a toner batch, a color drift and a noise source in order to cause the at least two colors to become noticeably different via the matching color control unit. In other embodiments, a step or operation can be implemented for providing consistency and stability to match the at least two colors to improve and maintain an invisibility of the hidden mark. In other embodiments, the hidden mark may be a barcode, text, a security mark, etc.

In still another embodiment, a system can be implemented for dual color matching feedback control. Such a system may include, for example, a processor and a data bus coupled to the processor. Such a system can also include a computer-usable medium embodying computer code, the computer-usable medium being coupled to the data bus, the computer program code comprising instructions executable by the processor and configured for measuring at least two color mixtures utilizing an inline spectrophotometer sensor in order to thereafter adjust the at least two color mixtures to match each other in color appearance; selecting a customized color from a smaller gamut of darker color by a customer and maintaining a sufficient difference in a black toner between the at least two color mixtures to provide a sufficient contrast for an infrared detection; and providing an initial match by incorporating a color model that is similar to a predicted color mixture in order to thereafter render and adjust the at least two colors for a better match prior to rendering a hidden mark.

In some embodiments, such instructions can be further configured for adjusting the at least two color mixture to match each other in the color appearance via a matching color control unit. In another embodiment, the instructions can be configured for adjusting an amount of other toner so that a color difference between the hidden mark colorant and a surrounding colorant is minimized and a presence of the hidden mark is less detectable to the observer under a standard condition. In yet another embodiment, such instructions can be further configured for hiding the mark in a broader range from the customer selectable color. In yet another embodiment, such instructions can be further configured for compensating differences across at least one of a color rendering device, a toner batch, a color drift and a noise source in order to cause the at least two colors to become noticeably different via the matching color control unit. In still other embodiments, such instructions can be further configured for periodically providing consistency and stability to match the at least two colors to improve and maintain an invisibility of the hidden mark. As indicated previously, the hidden mark can be a barcode, text, a security mark, etc.

In still other embodiments, a processor-readable medium storing code representing instructions to cause a processor to perform a process, can be implemented. Such code may comprise code to, for example, measure at least two color mixtures utilizing an inline spectrophotometer sensor in order to thereafter adjust the at least two color mixtures to match each other in color appearance; select a customized color from a smaller gamut of darker color by a customer and maintaining a sufficient difference in a black toner between the at least two color mixtures to provide a sufficient contrast for an infrared detection; and provide an initial match by incorporating a color model that is similar to a predicted color mixture in order to thereafter render and adjust the at least two colors for a better match prior to rendering a hidden mark. The code can be further configured in other embodiments to adjust the at least two color mixture to match each other in the color appearance via a matching color control unit.

In general, a dual color matching feedback control method, system and/or processor-readable medium is disclosed for hiding an infrared marking in a wide range of customer selectable colors. The disclosed approach includes an inline spectrophotometer sensor to measure at least two color mixtures and a matching color feedback control unit adjusts the two mixtures to match each other in color appearance. A customized color can be selected from a smaller gamut of darker color by a customer and a sufficient difference in a black toner (k toner) between the two color mixtures can be maintained to provide sufficient contrast for the infrared detection. An initial match can be provided by incorporating a color model that is similar to a predicted color mixture. The two colors can then be rendered and adjusted for better match prior to rendering the hidden mark. Such an approach adjusts an amount of other toners so that the color difference between the hidden mark colorant and a surrounding colorant is minimized and a presence of the hidden mark is less detectable to the observer under a standard condition.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A dual color matching feedback control method for hiding infrared markings conveying information within a combination of at least two colors, said method comprising:

measuring at least two colors of varying contrast mixed to hide infrared markings utilizing an inline spectrophotometer sensor in order to thereafter adjust the contrast of black toner for each of the said at least two colors to match each other in color appearance when mixed together, wherein at least one color provides infrared markings and at least one other color provides surrounding colorant to hide the infrared markings;

selecting a customized color from a smaller gamut of darker color and maintaining a sufficient difference in black toner between said at least two colors to provide a sufficient contrast for an infrared detection of the infrared markings from the surrounding colorant while minimizing detectability of the infrared markings by an average observer by maintaining a close match between the at least two colors; and providing an initial match by incorporating a color model that is similar to a predicted color mixture in order to thereafter render and adjust said at least two colors for a closer match prior to rendering the infrared markings with the surrounding colorant in a manner that will enable infrared detection of the infrared markings given the difference in black toner provided between the at least two colors while minimizing detectability of the infrared markings by an average observer by maintaining a close match between the at least two colors.

2. The method of claim 1 further comprising adjusting said at least two color mixture to match each other in said color appearance via a matching color control unit.

3. The method of claim 1 further comprising adjusting an amount of other toner so that a color difference between said hidden mark colorant and a surrounding colorant is minimized and a presence of said hidden mark is less detectable to said observer under a standard condition.

4. The method of claim 1 further comprising hiding said mark in a broader range from said customer selectable color.

5. The method of claim 1 further comprising providing said hiding for a limited palette of colors.

6. The method of claim 1 further comprising compensating differences across at least one of a color rendering device, a toner batch, a color drift and a noise source in order to cause said at least two colors to become noticeably different via said matching color control unit.

7. The method of claim 1 further comprising periodically providing consistency and stability to match said at least two colors to improve and maintain an invisibility of said hidden mark.

8. The method of claim 1 further comprising configuring said hidden mark to comprise a barcode.

9. The method of claim 1 further comprising configuring said hidden mark to comprise text.

10. The method of claim 1 further comprising configuring said hidden mark to comprise a security mark.

11. The method of claim 1 further comprising configuring said hidden mark to comprise at least one of the following types of marks: a barcode; text; or a security mark.

12. A dual color matching feedback control system, said system comprising:
    a processor;
    a data bus coupled to said processor; and
    a computer-usable medium embodying computer code, said computer-usable medium being coupled to said data bus, said computer program code comprising instructions executable by said processor and configured for:
    measuring at least two colors of varying contrast mixed to hide infrared markings utilizing an inline spectrophotometer sensor in order to thereafter adjust the contrast of black toner for each of the said at least two colors to match each other in color appearance when mixed together, wherein at least one color provides infrared markings and at least one other color provides surrounding colorant to hide the infrared markings;
    selecting a customized color from a smaller gamut of darker color and maintaining a sufficient difference in black toner between said at least two colors to provide a sufficient contrast for an infrared detection of the infrared markings from the surrounding colorant while minimizing detectability of the infrared markings by an average observer by maintaining a close match between the at least two colors; and
    providing an initial match by incorporating a color model that is similar to a predicted color mixture in order to thereafter render and adjust said at least two colors for a closer match prior to rendering the infrared markings with the surrounding colorant in a manner that will enable infrared detection of the infrared markings given the difference in black toner provided between the at least two colors while minimizing detectability of the infrared markings by an average observer by maintaining a close match between the at least two colors.

13. The system of claim 12 wherein said instructions are further configured for adjusting said at least two color mixture to match each other in said color appearance via a matching color control unit.

14. The system of claim 12 wherein said instructions are further configured for adjusting an amount of other toner so that a color difference between said hidden mark colorant and a surrounding colorant is minimized and a presence of said hidden mark is less detectable to said observer under a standard condition.

15. The system of claim 12 wherein said instructions are further configured for hiding said mark in a broader range from said customer selectable color.

16. The system of claim 12 wherein said instructions are further configured for compensating differences across at least one of a color rendering device, a toner batch, a color drift and a noise source in order to cause said at least two colors to become noticeably different via said matching color control unit.

17. The system of claim 12 wherein said instructions are further configured for periodically providing consistency and stability to match said at least two colors to improve and maintain an invisibility of said hidden mark.

18. The system of claim 12 wherein said hidden mark comprises at least one of a barcode, text and/or a security mark.

19. A non-transitory processor-readable medium storing code representing instructions to cause a processor to perform a process, the code comprising code to:
    measure at least two colors of varying contrast mixed to hide infrared markings utilizing an inline spectrophotometer sensor in order to thereafter adjust the contrast of black toner for each of the said at least two colors to match each other in color appearance when mixed together, wherein at least one color provides infrared markings and at least one other color provides surrounding colorant to hide the infrared markings;
    select a customized color from a smaller gamut of darker color and maintaining a sufficient difference in black toner between said at least two colors to provide a sufficient contrast for an infrared detection of the infrared markings from the surrounding colorant while minimizing detectability of the infrared markings by an average observer by maintaining a close match between the at least two colors; and
    provide an initial match by incorporating a color model that is similar to a predicted color mixture in order to thereafter render and adjust said at least two colors for a closer match prior to rendering the infrared markings with the surrounding colorant in a manner that will enable infrared detection of the infrared markings given the difference in black toner provided between the at least two colors while minimizing detectability of the infrared markings by an average observer by maintaining a close match between the at least two colors.

20. The non-transitory process-readable medium of claim 19 wherein said code is further configured to adjust said at least two color mixture to match each other in said color appearance via a matching color control unit.

* * * * *